United States Patent
Qu (10) Patent No.: US 10,481,569 B2
(45) Date of Patent: Nov. 19, 2019

(54) HOUSEHOLD APPLIANCE CONTROL METHOD AND DEVICE, AND CENTRAL PROCESSING DEVICE

(71) Applicant: YULONG COMPUTER TELECOMMUNICATION SCIENTIFIC (SHENZHEN) CO., LTD., Shenzhen (CN)

(72) Inventor: Yong-Gang Qu, Shenzhen (CN)

(73) Assignee: YULONG COMPUTER TELECOMMUNCATION SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/940,975

(22) Filed: Mar. 30, 2018

(65) Prior Publication Data

US 2018/0224812 A1 Aug. 9, 2018

Related U.S. Application Data

(63) Continuation-in-part of application No. PCT/CN2016/097039, filed on Aug. 27, 2016.

(30) Foreign Application Priority Data

Sep. 30, 2015 (CN) .......................... 2015 1 0639240

(51) Int. Cl.
*G05B 15/02* (2006.01)
*G06K 9/00* (2006.01)
(Continued)

(52) U.S. Cl.
CPC ......... *G05B 15/02* (2013.01); *G06K 9/00604* (2013.01); *G10L 15/22* (2013.01);
(Continued)

(58) Field of Classification Search
None
See application file for complete search history.

(56) References Cited

U.S. PATENT DOCUMENTS

| 6,304,648 B1 * | 10/2001 | Chang | H04M 3/567 |
| | | | 348/14.08 |
| 2010/0138668 A1 * | 6/2010 | Tsuria | G06F 21/32 |
| | | | 713/186 |

(Continued)

FOREIGN PATENT DOCUMENTS

| CN | 1423228 A | 6/2003 |
| CN | 104065986 A | 9/2014 |

(Continued)

*Primary Examiner* — Ziaul Karim
(74) *Attorney, Agent, or Firm* — ScienBiziP, P.C.

(57) ABSTRACT

The present disclosure provides a household appliance control method, which includes: receiving pupil detection information sent by a household appliance, the pupil detection information being acquired when the household appliance detects pupils of a user; determining whether the household appliance satisfies a preset control condition according to the pupil detection information; and sending a control instruction to the household appliance to enable the household appliance to be turned on or turned off according to the control instruction, when the household appliance satisfies the preset control condition. Correspondingly, the present disclosure also provides a central processing device including a household appliance control device. By utilizing embodiments of the present disclosure, the household appliances can be turned on or turned off automatically according to eyes of the user, and user experience is enhanced.

12 Claims, 5 Drawing Sheets

(51) Int. Cl.
*G10L 15/22* (2006.01)
*G10L 25/51* (2013.01)
*H04L 12/28* (2006.01)

(52) U.S. Cl.
CPC .......... *G10L 25/51* (2013.01); *H04L 12/2816* (2013.01); *G06K 9/00617* (2013.01); *G10L 2015/223* (2013.01)

(56) References Cited

U.S. PATENT DOCUMENTS

| | | | | |
|---|---|---|---|---|
| 2012/0019674 A1* | 1/2012 | Ohnishi | ............... | G08C 17/00 348/207.1 |
| 2016/0066127 A1* | 3/2016 | Choi | ............... | H04L 67/12 455/41.2 |
| 2016/0124506 A1* | 5/2016 | Hwang | ............... | G06F 3/017 345/156 |

FOREIGN PATENT DOCUMENTS

| | | |
|---|---|---|
| CN | 104834222 A | 8/2015 |
| CN | 105245416 A | 1/2016 |
| WO | 2013134830 A1 | 9/2013 |

* cited by examiner

HOUSEHOLD APPLIANCE CONTROL METHOD AND DEVICE, AND CENTRAL PROCESSING DEVICE

CROSS-REFERENCE TO RELATED APPLICATIONS

This application claims priority of Chinese Patent Application No. 201510639240.0, entitled "data sharing method for terminal, data sharing apparatus and terminal," filed on Sep. 30, 2015 in the SIPO (State Intellectual Property Office of the People's Republic of China), the entire contents of which are incorporated by reference herein.

FIELD

The embodiments of the present disclosure relates to a technical field of smart homes, specifically a household appliance control method and device, and a central processing device.

BACKGROUND

With the continuous improvement of the standard of living of people, various household appliances begin to enter into people's lives. More and more household appliances bring convenience to the people's lives, and troubles are brought to people. Traditional household appliance including an air conditioner, a refrigerator, a washing machine, a television and other equipments, have independent switches or remote controllers respectively to perform independent controls, unified regulation and control cannot be realized, and it is inconvenient to control. For example, when the air conditioner needs to be turned on, a remote controller of the air conditioner cannot be found; for another example, when a lamp needs to be turned off, the people have to get out of bed before they go to sleep. These traditional control methods degrade user experience.

BRIEF DESCRIPTION OF THE DRAWINGS

In order to describe the technical solutions in embodiments of the present disclosure or in the prior art more clearly, the following briefly introduces the accompanying drawings needed for describing the embodiments. The accompanying drawings in the following description show some embodiments of the present disclosure, and persons of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. The described embodiments are a part rather than all of the embodiments of the present disclosure. All other embodiments acquired by persons of ordinary skill in the art based on the embodiments of the present disclosure without creative efforts shall fall within the protection scope of the present disclosure.

In this part, the concept related to various embodiments of the present disclosure is described first.

Figure 1:
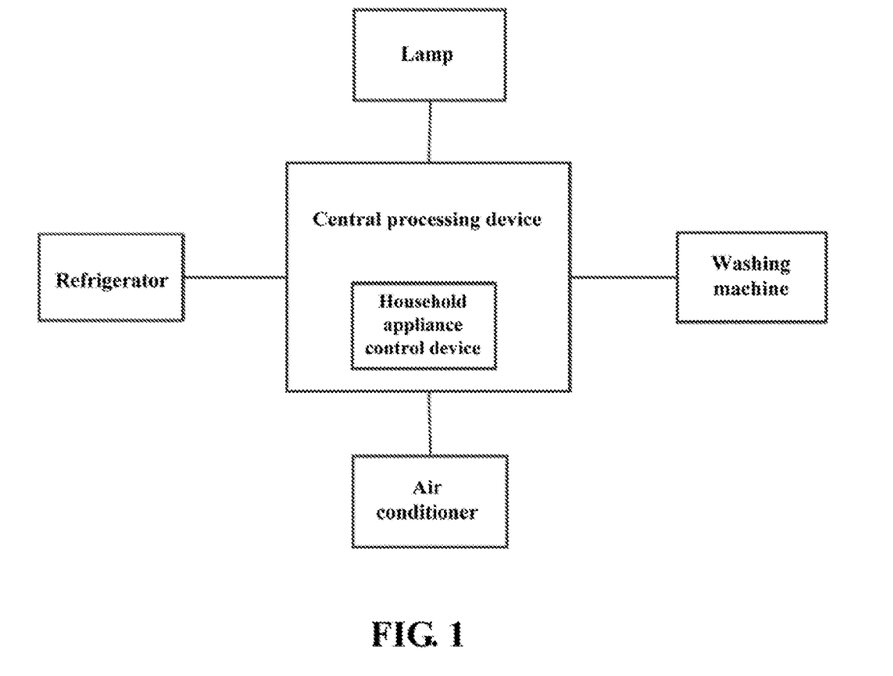
FIG. 1 is a schematic diagram of household appliances scene provided in an embodiment of the present disclosure.

The household appliances provided in embodiments of the present disclosure include, but are not limited to, a refrigerator, an air conditioner, a washing machine, a microwave oven or a lamp, etc. The present disclosure provides a household appliance control method, which can be applied to a central processing device, the central processing device is connected to various household appliances, as shown in FIG. 1. It should be noted that, the connections shown in FIG. 1 include, but are not limited to, an electric connection or a wireless connection.

To implement the embodiment of the present disclosure, the household appliance can be controlled by eyes of a user to be turned on or turned off, thereby enhancing the user experience. The embodiments corresponding to FIG. 2 and FIG. 3 are described in detail as follows.

Figure 2:
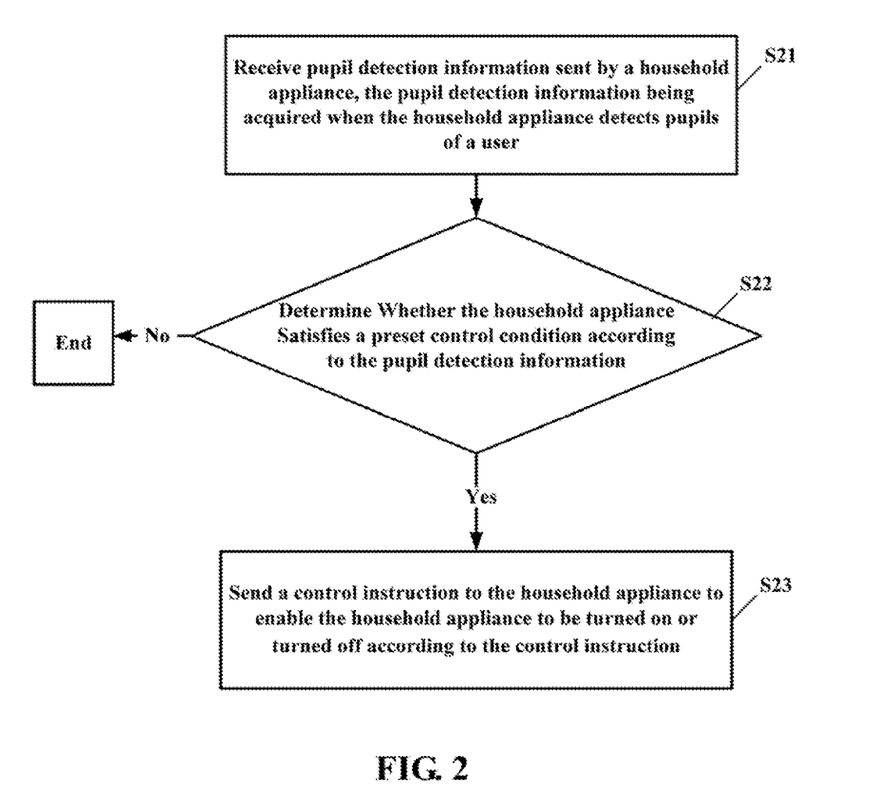
FIG. 2 is a flow diagram of a household appliance control method provided in an embodiment of the present disclosure.
Figure 3:
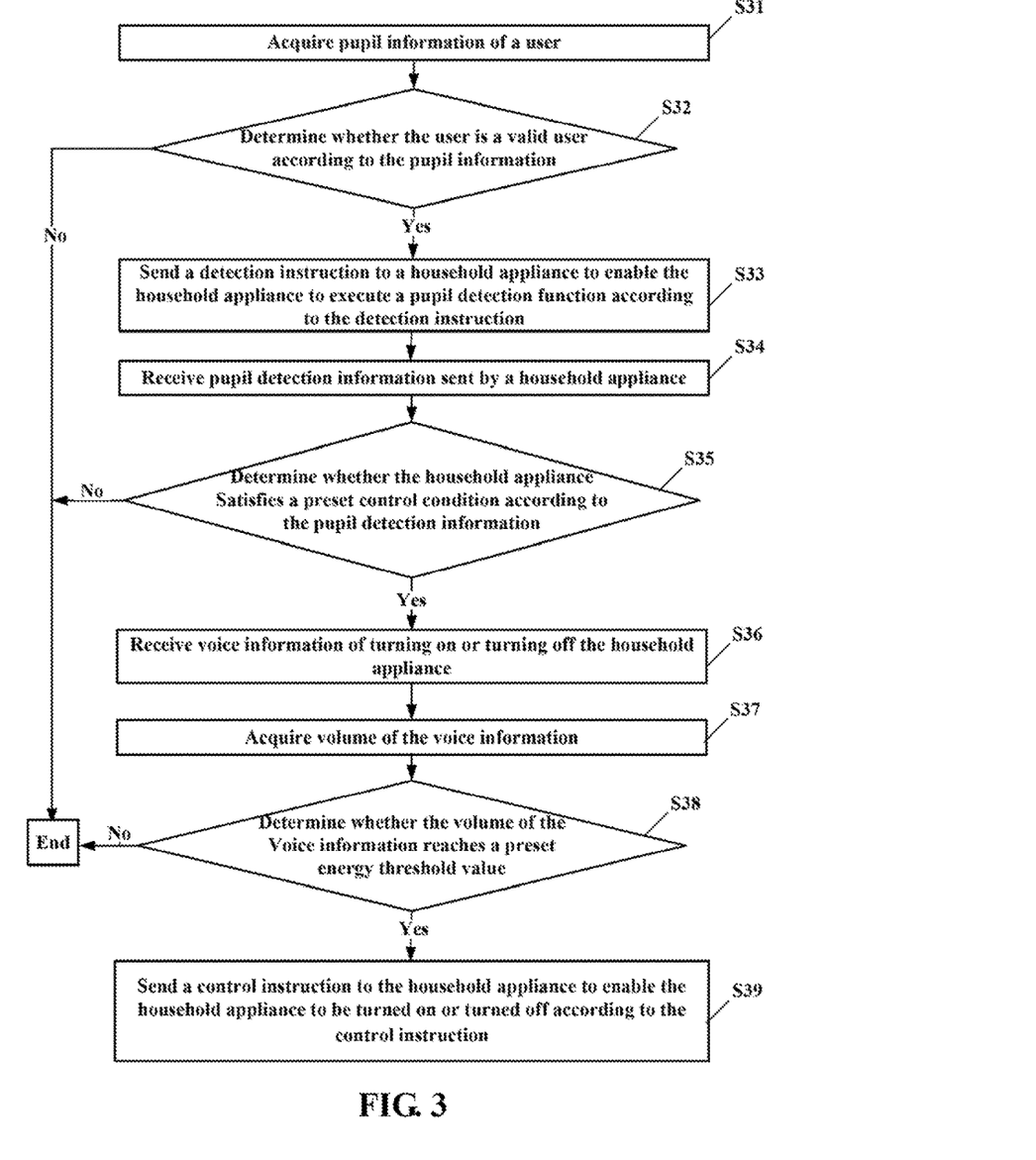
FIG. 3 is a flow diagram of another household appliance control method provided in an embodiment of the present disclosure.

Referring to FIG. 2, FIG. 2 is a flow diagram of a household appliance control method provided in an embodiment of the present disclosure. As shown in FIG. 2, the method may include:

Step S21, receiving pupil detection information sent by a household appliance, the pupil detection information being acquired when the household appliance detects pupils of a user.

The central processing device can verify the identity of the user. If the user is a valid user, a detection instruction is sent to a household appliance within a controllable range, and the household appliance enables a pupil detection function according to the detection instruction. After the pupil detection function is enabled, the household appliance can acquire the pupil detection information. Specifically, a distance measuring equipment can be installed on the household appliance, and the distance measuring equipment can identify the left pupil and the right pupil. When the household appliance enables the pupil detection function, the household appliance can continuously detect the pupils. If the pupils are detected, a first distance between the household appliance and the left pupil of the user, and a second distance between the household appliance and the right pupil of the user are acquired, and then the pupil detection information carried with the first distance and the second distance is sent to the central processing device. Moreover, the household appliance can also acquire a difference value between the first distance and the second distance, and the difference value is carried in the pupil detection information to be sent to the central processing device.

Moreover, the user can wear distance measuring glasses, and the distance measuring glasses include a first receiving device and a second receiving device. The distance measuring device installed on the household appliance includes a first transmitting device and a second transmitting device. A signal transmitted by the first transmitting device is received by the first receiving device of the distance measuring glasses, and a signal transmitted by the second transmitting device is received by the second receiving device of the distance measuring glasses. The signals transmitted by the distance measuring device can include transmission time point information. After receiving the signals, the distance measuring glasses acquires current time point information and inserts the acquired current time point information into the received signals, which is fed back to the distance measuring device. The distance measuring device can determine distances between the household appliance and the left pupil and the right pupil respectively (e.g., the first distance and the second distance), according to the two pieces of time point information in the received signals.

In an embodiment, the central processing device may be equipped with a fingerprint identification module to verify whether the user is a valid user by comparing acquired fingerprint information and reference fingerprint information. If the acquired fingerprint information matches the reference fingerprint information, the user is determined to be a valid user. How to match fingerprints is understood by persons skilled in the art and will not be described in detail herein.

In another embodiment, the central processing device may be equipped with a pupil identification module to verify whether the user is a valid user by comparing acquired pupil information and reference pupil information. If the acquired pupil information matches the reference pupil information, the user is determined to be a valid user. How to match pupils is understood by persons skilled in the art and will not be described in detail herein.

Embodiments of the present disclosure can also verify whether the user is a valid user in other manners, such as voice verification, digital password verification, sliding track verification, etc. Accordingly, the present disclosure is not limited to any particular manners or embodiments.

Step S22, determining whether the household appliance satisfies a preset control condition according to the pupil detection information; if the household appliance satisfies the preset control condition, step S23 is executed; otherwise, if the household appliance does not satisfy the preset control condition, the procedure ends.

Specifically, when the central processing device receives the pupil detection information sent by the household appliance, the central processing device can determine whether the household appliance satisfies the preset control condition according to the pupil detection information.

If the pupil detection information includes the first distance between the household appliance and the left pupil of the user, and the second distance between the household appliance and the right pupil of the user, the central processing device can determine whether a difference value between the first distance and the second distance is within a preset distance threshold value. If the difference value is within the preset distance threshold value, it is indicated that the eyes of the user are staring at the household appliance, and it is determined that the household appliance satisfies the preset control condition;

If the pupil detection information includes pupil difference information, and the pupil difference value information is the difference value between the first distance and the second distance, the central processing device can directly determine whether the pupil difference value information is within the preset distance threshold value. If the pupil difference value information is within the preset distance threshold value, it is indicated that the eyes of the user are staring at the household appliance, and it is determined that the household appliance satisfies the preset control condition.

The preset distance threshold value can be an empirical value, which is set before the central processing device leaves the factory, certainly, the preset distance threshold value also can be adjusted by the user when in use, and the present disclosure is not limited to any particular mode of operation.

Step S23, sending a control instruction to the household appliance, to enable the household appliance to be turned on or turned off according to the control instruction.

Specifically, if the household appliance satisfies the preset control condition, the control instruction can be sent to the household appliance, to enable the household appliance to be turned on or turned off according to the control instruction.

Moreover, before the central processing device sends the control instruction to the household appliance, the central processing device can also receive voice information. If the voice information, such as "turning on" or "turning off", the household appliance is received, the control instruction is sent to the household appliance, thus, a misoperation on the appliance can be avoided. In the implementation, the central processing device can be equipped with a voice module in advance, and store a character string corresponding to turning on or turning off the household appliance. The voice module can convert speaking voice of the user into voice data, convert the voice data into a character string, and compare acquired character string with a preset character string. If the acquired character string matches the preset character string, it is indicated that the user needs to turn on or turn off the household appliance at present, then the control instruction is sent to the household appliance.

Moreover, after receiving the voice information of turning on or turning off the household appliance, the central processing device further can acquire volume of the voice information, and determine whether the volume of the voice information reaches a preset energy threshold value. If the volume reaches the preset energy threshold value, it is indicated that the user intends to turn on or turn off the household appliance, and then the control instruction is sent to the household appliance, thus, a misoperation can be further avoided. For example, when voice information of "turning on" is received and volume of the voice information is equal to or more than the preset energy threshold value, it is determined that the user intends to turn on the household appliance, then a control instruction for turning on the household appliance is sent to the household appliance. The preset energy threshold value can be an empirical value, which is set before the central processing device leaves the factory, certainly, the preset energy threshold value also can be adjusted by the user when in use, and the present disclosure is not limited to any particular mode of operation.

In an embodiment shown in FIG. 2, the central processing device can receive the pupil detection information sent by the household appliance, and determine whether the household appliance satisfies the preset control condition according to the pupil detection information. As the pupil detection information is acquired when the household appliance detects pupils of a user, thus, if the household appliance satisfies the preset control condition, it is indicated that the user is staring at a household appliance, which is the household appliance that the user intends to control, then the control instruction is sent to the household appliance to enable the household appliance to be turned on or turned off according to the control instruction. Thus, the household appliance can be controlled by the eyes of the user, furthermore, the user experience is enhanced.

Referring to FIG. 3, FIG. 3 is a flow diagram of another household appliance control method provided in an embodiment of the present disclosure. As shown in FIG. 3, the method includes one or more of the following steps:

Step S31, acquiring pupil information

Step S32, determining whether the user is a valid user according to the pupil information; if the user is a valid user, step S33 is executed.

Step S33, sending a detection instruction to the household appliance, to enable the household appliance to execute a pupil detection function according to the detection instruction.

After the pupil detection function is enabled, the household appliance can acquire the pupil detection information. Specifically, a distance measuring equipment can be installed on the household appliance, and the distance measuring equipment can identify the left pupil and the right pupil. When the household appliance enables the pupil detection function, the household appliance can continuously detect the pupils. If the pupils are detected, a first distance between the household appliance and the left pupil of the user, and a second distance between the household appliance and the right pupil of the user are acquired, and then the pupil detection information carried with the first distance and the second distance is sent to the central processing device. Moreover, the household appliance can also acquire a difference value between the first distance and the second distance, and the difference value is carried in the pupil detection information to be sent to the central processing device.

Moreover, the user can wear distance measuring glasses, and the distance measuring glasses include a first receiving device and a second receiving device. The distance measuring device installed on the household appliance includes a first transmitting device and a second transmitting device. A signal transmitted by the first transmitting device is received by the first receiving device of the distance measuring glasses, and a signal transmitted by the second transmitting device is received by the second receiving device of the distance measuring glasses. The signals transmitted by the distance measuring device can carry transmission time point information. After receiving the signals, the distance measuring glasses acquires current time point information and inserts the acquired current time point information into the received signals, which is fed back to the distance measuring device. The distance measuring device can determine distances between the household appliance and the left pupil and the right pupil respectively (e.g., the first distance and the second distance), according to the two pieces of time point information in the received signals.

Step S34, receiving pupil detection information sent by the household appliance.

Step S35, determining whether the household appliance satisfies a preset control condition according to the pupil detection information; if the household appliance satisfies the preset control condition, step S36 is executed; otherwise, if the household appliance does not satisfy the preset control condition, the procedure ends.

If the pupil detection information includes the first distance between the household appliance and the left pupil of the user, and the second distance between the household appliance and the right pupil of the user, the central processing device can determine whether a difference value between the first distance and the second distance is within a preset distance threshold value. If the difference value is within the preset distance threshold value, it is indicated that the eyes of the user are staring at the household appliance, and it is determined that the household appliance satisfies the preset control condition.

If the pupil detection information includes pupil difference information, and the pupil difference value information is the difference value between the first distance and the second distance, the central processing device can directly determine whether the pupil difference value information is within the preset distance threshold value. If the pupil difference value information is within the preset distance threshold value, it is indicated that the eyes of the user are staring at the household appliance, and it is determined that the household appliance satisfies the preset control condition.

Step S36, receiving voice information of turning on or turning off the household appliance.

Step S37, acquiring volume of the voice information.

Step S38, determining whether the volume of the voice information reaches a preset energy threshold value; if the volume reaches the preset energy threshold value, step S39 is executed.

It should be noted that there is no strict execution sequence between step S35 and step S38, and the steps can be synchronously executed.

Step S39, sending a control instruction to the household appliance, to enable the household appliance to be turned on or turned off according to the control instruction.

In the embodiment shown in FIG. 3, after determining that the household appliance satisfies the preset control condition, the central processing device further can receive the voice information of turning on or turning off the household appliance. If the volume of the voice information reaches the preset energy threshold value, the central processing device can send the control instruction to the household appliance so as to enable the household appliance to be turned on or turned off according to the control instruction Thus, the household appliance can be controlled by a combination of the eyes and the voice, and a misoperation is further avoided.

Figure 4:
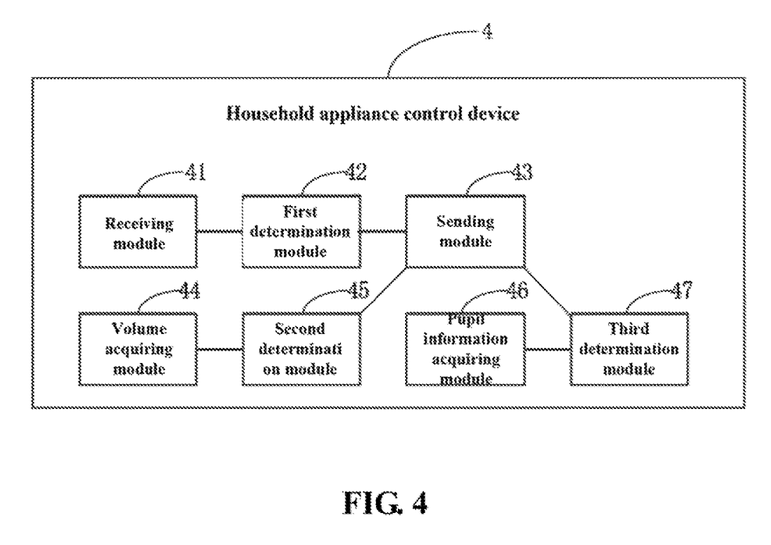
FIG. 4 is a schematic structural diagram of a household appliance control device provided in an embodiment of the present disclosure.

Referring to FIG. 4, FIG. 4 is a schematic structural diagram of a household appliance control device provided in an embodiment of the present disclosure. As shown in FIG. 4, a household appliance control device 4 can include at least a receiving module 41, a first determination module 42 and a sending module 43:

The receiving module 41 is configured to receive pupil detection information sent by a household appliance, and the pupil detection information is acquired when the household appliance detects pupils of a user.

The first determination module 42 is configured to determine whether the household appliance satisfies a preset control condition according to the pupil detection information.

The pupil detection information may include a first distance between the household appliance and a left pupil of the user, and a second distance between the household appliance and a right pupil of the user;

The first determination module 42 is specifically configured to:

Determine whether a difference value between the first distance and the second distance is within a preset distance threshold value, and determine that the household appliance satisfies the preset control condition when the difference value is within the preset distance threshold value.

The sending module 43 is configured to send a control instruction to the household appliance, to enable the household appliance to be turned on or turned off according to the control instruction, when the household appliance satisfies the preset control condition.

Moreover, the receiving module 41 is further configured to:

Receive voice information of turning on or turning off the household appliance.

Moreover, the household appliance control device 4 further includes a volume acquiring module 44 and a second determination module 45, in which:

The volume acquiring module 44 is configured to acquire volume of the voice information;

The second determination module 45 is configured to determine whether the volume of the voice information reaches a preset energy threshold value, and trigger the sending module 43 to send the control instruction to the household appliance when the volume reaches the preset energy threshold value.

Moreover, the household appliance control device 4 further includes a pupil information acquiring module 46 and a third determination module 47, in which:

The pupil information acquiring module 46 is configured to acquire pupil information of the user;

The third determination module 47 is configured to determine whether the user is a valid user according to the pupil information;

The sending module 43 is further configured to:

Send a detection instruction to the household appliance, to enable the household appliance to execute a pupil detection function according to the detection instruction.

It can be understood that the functions of the various function modules of the household appliance control device 4 in the embodiment can be realized according to the method in the method embodiments as mentioned above, corresponding to the relevant descriptions of the method embodiments of FIG. 2 to FIG. 3, and the descriptions are not repeated herein.

In the embodiment shown in FIG. 4, the receiving module can receive the pupil detection information sent by the household appliance, the first determination module can determine whether the household appliance satisfies the preset control condition according to the pupil detection information. As the pupil detection information is acquired when the household appliance detects the pupils of the user, thus, if the household appliance satisfies the preset control condition, it is indicated that the user is staring at a household appliance, which is the household appliance that the user intends to control, then the sending module sends the control instruction to enable the household appliance to be turned on or turned off according to the control instruction. Thus, the household appliance can be controlled by the eyes of the user, furthermore, the user experience is enhanced.

Figure 5:
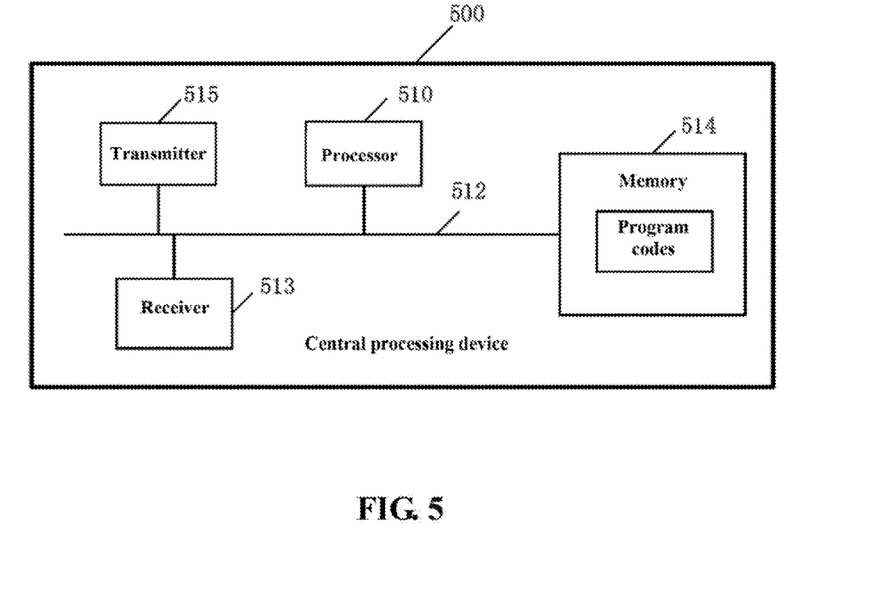
FIG. 5 is a schematic structural diagram of a central processing device provided in an embodiment of the present disclosure.

Referring to FIG. 5, FIG. 5 is a schematic structural diagram of a central processing device provided in an embodiment of the present disclosure.

In an embodiment of the present disclosure, a central processing device 500 can be different types of electronic devices, such as a smart phone, a tablet computer, a palm computer, a mobile Internet device, a personal digital assistant, a media player, a smart television, a smart watch, smart glasses, a smart band, etc. As shown in FIG. 5, in an embodiment of the present disclosure, the central processing device 500 includes at least one processor 510, such as a central processing unit (CPU), at least one receiver 513, at least one memory 514, at least one transmitter 515, and at least one communication bus 512. The communication bus 512 is used for realizing connection communications between these components. The receiver 513 and the transmitter 515 may be wired transmission ports, and can also be wireless equipments, such as including an antenna device, which is used for implementing data communications with other equipments. The memory 514 may be a high-speed random-access memory (RAM) or a non-volatile memory, such as at least one magnetic disk storage.

The processor 510 can execute an operating system and various installed application programs, program codes of the central processing device 500, etc., for example, each of the various modules as mentioned above, which includes the receiving module 41, the first determination module 42, the sending module 43, the volume acquiring module 44, the second determination module 45, the pupil information acquiring module 46, and the third determination module 47, etc.

The memory 514 stores program codes, and the processor 510 can invoke the program codes stored in the memory 514 to perform corresponding functions through the communication bus 512.

For example, each of the various modules in FIG. 4 (e.g., the receiving module 41, the first determination module 42, the sending module 43, the volume acquiring module 44, the second determination module 45, the pupil information acquiring module 46, and the third determination module 47, etc.) is program codes stored in the memory 514 and executed by the processor 510, so as to perform the functions of each module to realize the control of the household appliance.

In an embodiment of the present disclosure, the memory 514 stores a plurality of instructions, and the plurality of instructions are executed by the processor 510 to realize the household appliance control method. Specifically, the processor 510 receives a pupil detection information sent by a household appliance, and the pupil detection information is acquired when the household appliance detects pupils of a user; the processor 510 determines whether the household appliance satisfies a preset control condition according to the pupil detection information; if the household appliance satisfies the preset control condition, the processor 510 sends a control instruction to the household appliance, to enable the household appliance to be turned on or turned off according to the control instruction.

In a further embodiment, the pupil detection information includes a first distance between the household appliance and a left pupil of the user, and a second distance between the household appliance and a right pupil of the user; the processor 510 determines whether a difference value between the first distance and the second distance is within a preset distance threshold value; if the difference value is within the preset distance threshold value, the processor 510 determines that the household appliance satisfies the preset control condition.

In a further embodiment, before the processor 510 sends a control instruction to the household appliance, the processor 510 receives voice information of turning on or turning off the household appliance.

In a further embodiment, after the processor 510 receives the voice information of turning on or turning off the household appliance, the processor 510 acquires volume of the voice information; the processor 510 determines whether the volume of the voice information reaches a preset energy threshold value; and if the volume reaches the preset energy threshold value, the processor 510 sends the control instruction to the household appliance device.

In a further embodiment, before the processor 510 receives the pupil detection information sent by the household appliance device, the processor 510 acquires the pupil information of the user; determines whether the user is a valid user according to the pupil information; if the user is a valid user, the processor 510 sends a detection instruction to the household appliance, to enable the household appliance to execute a pupil detection function according to the detection instruction.

Specifically, specific implementation method of the instruction performed by the processor 510 can refer to the relevant steps in the corresponding embodiments of FIG. 2 and FIG. 3, and it is not repeated herein.

It should be noted that, in the above embodiments, the descriptions of each embodiment have different emphasis. If some descriptions in an embodiment are not described in detail, these descriptions can be referred to the relevant descriptions in other embodiments. Secondly, those persons skilled in the art should also know that the embodiments described in the specification are preferred embodiments, the actions and the modules involved in the present disclosure are not necessarily required by the embodiments of the present disclosure.

The steps in the method provided in the embodiments of the present disclosure can be adjusted to have a different sequence, combined and deleted according to actual needs.

The modules in the device provided in the embodiments of the present disclosure can be combined, divided and deleted according to actual needs.

In some embodiments of the present disclosure, the modules may be implemented by a general-purpose Integrated Circuit, such as a central processing unit (CPU), or can be realized by an application specific integrated circuit (ASIC).

Persons of ordinary skill in the art can understand that all or part of the procedures in the method of the above embodiments can be realized by instructing relevant hardware through a computer program, the program can be stored in a computer readable storage medium, when the program is executed, the program can include the procedure of the methods in the above embodiments. The storage medium can be a magnetic disk, an optical disk and a read-only memory (ROM) or a random access memory (RAM) etc.

The above mentioned descriptions are merely preferred embodiments of the present disclosure, and certainly, should not limit the scope of the present disclosure. Thus, any modification and equivalent according to the claims of the present disclosure, should be still within the scope of the present disclosure.

I claim:

1. A household appliance control method, comprising:
   receiving pupil detection information comprising a first distance between a household appliance and a left pupil of a user and a second distance between the household appliance and a right pupil of the user sent by the household appliance, the pupil detection information being acquired when the household appliance detects pupils of the user, wherein the household appliance is equipped with a distance measuring device comprising a first transmitting device and a second transmitting device, the user wears distance measuring glasses comprising a first receiving device and a second receiving device, the first receiving device receives a first signal comprising first transmission time point information from the first transmitting device, the second receiving device receives a second signal comprising second transmission time point information from the second transmitting device, the distance measuring glasses inserts first current time point information into the first signal when receiving the first signal and inserts second current time point information into the second signal when receiving the second signal, the distance measuring glasses transmits the first signal with the first current time point information and the second signal with the second current time point information to the distance measuring device, the distance measuring device determines the first distance according to the first transmission time point information and the first current time point information in the first signal and determines the second distance according to the second transmission time point information and the second current time point information in the second signal;
   determining whether the household appliance satisfies a preset control condition according to the pupil detection information, comprising:
      determining whether a difference value between the first distance and the second distance is within a preset distance threshold value; and
      determining that the household appliance satisfies the preset control condition, when the difference value is within the preset distance threshold value; and
   sending a control instruction to the household appliance to enable the household appliance to be turned on or turned off according to the control instruction, when the household appliance satisfies the preset control condition.

2. The household appliance control method of claim 1, before sending the control instruction to the household appliance, wherein the household appliance control method further comprises:
   receiving voice information of turning on or turning off the household appliance.

3. The household appliance control method of claim 2, after receiving the voice information of turning on or turning off the household appliance, wherein the household appliance control method further comprises:
   acquiring volume of the voice information;
   determining whether the volume of the voice information reaches a preset energy threshold value;
   sending the control instruction to the household appliance, when the volume reaches the preset energy threshold value.

4. The household appliance control method of claim 1, before receiving the pupil detection information sent by the household appliance, wherein the household appliance control method further comprises:
   acquiring pupil information of the user;
   determining whether the user is a valid user according to the pupil information;
   sending a detection instruction to the household appliance to enable the household appliance to execute a pupil detection function according to the detection instruction, when the user is a valid user.

5. A central processing device, comprising:
   at least one processor; and
   a storage device storing a plurality of instructions, which when executed by the at least one processor, causes the at least one processor to:
   receive pupil detection information comprising a first distance between a household appliance and a left pupil of a user and a second distance between the household appliance and a right pupil of the user sent by the household appliance, the pupil detection information being acquired when the household appliance detects pupils of the user, wherein the household appliance is equipped with a distance measuring device comprising a first transmitting device and a second transmitting device, the user wears distance measuring glasses comprising a first receiving device and a second receiving device, the first receiving device receives a first signal comprising first transmission time point information from the first transmitting device, the second receiving device receives a second signal comprising second transmission time point information from the second transmitting device, the distance measuring glasses inserts first current time point information into the first signal when receiving the first signal and inserts second current time point information into the second signal when receiving the second signal, the distance measuring glasses transmits the first signal with the first current time point information and the second signal with the second current time point information to the distance measuring device, the distance measuring device determines the first distance according to the first transmission time point information and the first current time point information in the first signal and determines the second distance according to the second transmission time point information and the second current time point information in the second signal;

determine whether the household appliance satisfies a preset control condition according to the pupil detection information, comprising:
  determining whether a difference value between the first distance and the second distance is within a preset distance threshold value; and
  determining that the household appliance satisfies the preset control condition, when the difference value is within the preset distance threshold value; and send a control instruction to the household appliance to enable the household appliance to be turned on or turned off according to the control instruction, when the household appliance satisfies the preset control condition.

6. The central processing device of claim 5, before sending the control instruction to the household appliance, wherein the at least one processor further:
  receives voice information of turning on or turning off the household appliance.

7. The central processing device of claim 6, after receiving the voice information of turning on or turning off the household appliance, wherein the at least one processor further:
  acquires volume of the voice information;
  determines whether the volume of the voice information reaches a preset energy threshold value;
  sends the control instruction to the household appliance, when the volume reaches the preset energy threshold value.

8. The central processing device of claim 5, before receiving the pupil detection information sent by the household appliance, wherein the at least one processor further:
  acquires pupil information of the user;
  determines whether the user is a valid user according to the pupil information;
  sends a detection instruction to the household appliance to enable the household appliance to execute a pupil detection function according to the detection instruction, when the user is a valid user.

9. A non-transitory storage medium having stored thereon instructions that, when executed by a processor of a central processing device, causes a processor of the central processing device to perform a household appliance control method, the household appliance control method comprising:
  receiving pupil detection information comprising a first distance between a household appliance and a left pupil of a user and a second distance between the household appliance and a right pupil of the user sent by the household appliance, the pupil detection information being acquired when the household appliance detects pupils of the user, wherein the household appliance is equipped with a distance measuring device comprising a first transmitting device and a second transmitting device, the user wears distance measuring glasses comprising a first receiving device and a second receiving device, the first receiving device receives a first signal comprising first transmission time point information from the first transmitting device, the second receiving device receives a second signal comprising second transmission time point information from the second transmitting device, the distance measuring glasses inserts first current time point information into the first signal when receiving the first signal and inserts second current time point information into the second signal when receiving the second signal, the distance measuring glasses transmits the first signal with the first current time point information and the second signal with the second current time point information to the distance measuring device, the distance measuring device determines the first distance according to the first transmission time point information and the first current time point information in the first signal and determines the second distance according to the second transmission time point information and the second current time point information in the second signal;

determining whether the household appliance satisfies a preset control condition according to the pupil detection information, comprising:
  determining whether a difference value between the first distance and the second distance is within a preset distance threshold value; and
  determining that the household appliance satisfies the preset control condition, when the difference value is within the preset distance threshold value; and sending a control instruction to the household appliance to enable the household appliance to be turned on or turned off according to the control instruction, when the household appliance satisfies the preset control condition.

10. The non-transitory storage medium according to claim 9, before sending the control instruction to the household appliance, wherein the household appliance control method further comprises:
  receiving voice information of turning on or turning off the household appliance.

11. The non-transitory storage medium according to claim 10, after receiving the voice information of turning on or turning off the household appliance, wherein the household appliance control method further comprises:
  acquiring volume of the voice information;
  determining whether the volume of the voice information reaches a preset energy threshold value;
  sending the control instruction to the household appliance, when the volume reaches the preset energy threshold value.

12. The non-transitory storage medium according to claim 9, before receiving the pupil detection information sent by the household appliance, wherein the household appliance control method further comprises:
  acquiring pupil information of the user;
  determining whether the user is a valid user according to the pupil information;
  sending a detection instruction to the household appliance to enable the household appliance to execute a pupil detection function according to the detection instruction, when the user is a valid user.

\* \* \* \* \*

UNITED STATES PATENT AND TRADEMARK OFFICE
CERTIFICATE OF CORRECTION

PATENT NO. : 10,481,569 B2  
APPLICATION NO. : 15/940975  
DATED : November 19, 2019  
INVENTOR(S) : Yong-Gang Qu

Page 1 of 1

It is certified that error appears in the above-identified patent and that said Letters Patent is hereby corrected as shown below:

On the Title Page

Please amend Item (73) regarding "Assignee" with the following:  
(73) YULONG COMPUTER TELECOMMUNICATION SCIENTIFIC (SHENZHEN) CO., LTD., Shenzhen (CN)

Signed and Sealed this  
Thirty-first Day of March, 2020

Andrei Iancu  
*Director of the United States Patent and Trademark Office*